United States Patent
Knoer et al.

(10) Patent No.: US 10,844,279 B2
(45) Date of Patent: *Nov. 24, 2020

(54) MODIFIED REACTIVE RESIN COMPOSITIONS AND USE THEREOF FOR COATING PROPPING AGENTS

(71) Applicant: Wacker Chemie AG, Munich (DE)

(72) Inventors: Sebastian Knoer, Emmerting (DE); Daniel Calimente, Saline, MI (US); Arndt Schlosser, Stammham (DE)

(73) Assignee: WACKER CHEMIE AG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/346,991

(22) PCT Filed: Jun. 29, 2017

(86) PCT No.: PCT/EP2017/066220
§ 371 (c)(1),
(2) Date: May 2, 2019

(87) PCT Pub. No.: WO2018/082818
PCT Pub. Date: May 11, 2018

(65) Prior Publication Data
US 2020/0063024 A1    Feb. 27, 2020

Related U.S. Application Data

(63) Continuation-in-part of application No. PCT/EP2016/076383, filed on Nov. 2, 2016.

(51) Int. Cl.
| | | |
|---|---|---|
| C09K 8/80 | (2006.01) | |
| C09D 7/63 | (2018.01) | |
| C08K 5/3477 | (2006.01) | |
| C08L 83/06 | (2006.01) | |
| C09D 161/06 | (2006.01) | |
| E21B 43/267 | (2006.01) | |
| C08G 77/18 | (2006.01) | |

(52) U.S. Cl.
CPC ............ C09K 8/805 (2013.01); C08K 5/3477 (2013.01); C08L 83/06 (2013.01); C09D 7/63 (2018.01); C09D 161/06 (2013.01); E21B 43/267 (2013.01); C08G 77/18 (2013.01)

(58) Field of Classification Search
CPC ........ C09K 8/805; C09D 161/06; C09D 7/63; E21B 43/267; C08L 83/06
See application file for complete search history.

(56) References Cited

U.S. PATENT DOCUMENTS

| | | | |
|---|---|---|---|
| 4,732,920 A | 3/1988 | Graham et al. | |
| 5,422,183 A | 6/1995 | Sinclair et al. | |
| 5,952,439 A | 9/1999 | Morita et al. | |
| 8,852,682 B2 | 10/2014 | Sinclair et al. | |
| 2007/0036977 A1 | 2/2007 | Sinclair et al. | |
| 2011/0237761 A1 | 9/2011 | Schäfer et al. | |
| 2011/0263751 A1* | 10/2011 | Mayer ................ | C09D 7/62 523/177 |
| 2012/0088699 A1 | 4/2012 | Qin | |
| 2013/0026662 A1 | 1/2013 | Iwashige et al. | |
| 2014/0124200 A1* | 5/2014 | Fournier ............. | C09K 8/805 166/280.2 |
| 2014/0162911 A1* | 6/2014 | Monastiriotis ....... | C09K 8/805 507/221 |

FOREIGN PATENT DOCUMENTS

| | | |
|---|---|---|
| JP | 3466239 B2 | 11/2003 |
| WO | 08088449 A2 | 7/2008 |
| WO | 10060861 A1 | 6/2010 |

OTHER PUBLICATIONS

Brandupetal—PolymerHandbook—4thed1999—PAN.
Könczöl L. et.al., J. of Applied Polymer Science, 54, 6 (1997), pp. 815-826.
Li, Zhongtao; MIT Thesis, 2000, High fracture toughness and high modules silicone resins.

* cited by examiner

*Primary Examiner* — Crystal J Miller
(74) *Attorney, Agent, or Firm* — Brooks Kushman P.C.

(57) ABSTRACT

Proppants coated with a cured reactive resin composition containing 92-99.5 wt. % of a reactive resin and 0.5 to 8 wt. % of a silicone resin containing at least 5 wt. % of alkoxy groups and at least 20 mol percent of T and/or Q units, in liquid form, exhibit high freedom from fines generation, and are free flowing.

16 Claims, No Drawings

MODIFIED REACTIVE RESIN COMPOSITIONS AND USE THEREOF FOR COATING PROPPING AGENTS

CROSS REFERENCE TO RELATED APPLICATIONS

This application is the U.S. National Phase of PCT Appln. No. PCT/EP2017/066220 filed Jun. 29, 2017, which claims priority to PCT Appln. No. PCT/EP2016/076383 filed Nov. 2, 2016, the disclosures of which are incorporated in their entirety by reference herein.

BACKGROUND OF THE INVENTION

1. Field of the Invention

The present invention relates to modified reactive resin compositions and to the use thereof as coating compositions for proppant materials that are used in hydraulic fracturing ("fracking").

2. Description of the Related Art

The fracking method is used in mineral oil and natural gas production and is a method of generating, widening and stabilizing cracks in the rock of a deposit deep underground, with the aim of increasing the permeability of the deposit box. As a result, gases or liquids present therein can flow in an easier and more stable manner to the well and be "produced."

The cracks generated have to be kept open with proppants. The coated or uncoated proppants currently available are brittle and do not have the necessary compressive strength for production at high depths. The fracturing of the proppants under the high pressure releases fine particles that block the cracks and reduce the oil or gas production rate.

The coated proppants available according to prior art have improved stability compared to the uncoated proppants. However, the effect of the coating, for example with organic resins, is limited by the fact that the available coatings themselves are very brittle and likewise have a tendency to fracture or flake off.

WO2008088449 A2 discloses a means of reducing the brittleness of the coatings of such particles, wherein thermally curing reactive resins, for example epoxy resins, are admixed with block copolymers and adhesion promoters in order thus to achieve an improvement in the impact resistance of the coating. As well as the use of two additives, it is an additional disadvantage that the toughness improver is a costly block copolymer which is difficult to prepare.

U.S. Pat. No. 8,852,682B2 discloses particles for use as proppant materials which have multiple partial coats interleafed together. A filler is explicitly metered in during the individual process steps. A disadvantage is the complex process. Various resins are used for coating, for example phenolic resins containing fumed silicas, for example, as reinforcing fillers.

U.S. Pat. No. 5,422,183A discloses particles for use as proppant materials in fracking methods which likewise have a two-layer coating composed of resins. Phenolic resins, for example, are used for coating, wherein fumed silicas are likewise used as filler. This filler is introduced into the interphase of the individual layers after the first coating step.

A disadvantage in both the preceding documents is the very complex multistage process which is costly and additionally difficult to control.

US20140124200A discloses the use of hybrid materials produced by chemical bonding of organic resins and silicone resins for coating of proppant materials. Disadvantages here are an additional complex process for chemical modification, and the difficulty of controlling product quality in the case of reaction of two branched polymers.

US2012088699A discloses a coated particle with at least two oleophilic and hydrophobic resins in a ratio of 1:0.1-10, wherein silicone resins inter alia may be used. A disadvantage is the use of silicone resins in very large amounts of at least 10% by weight, which is economically unattractive.

Also common knowledge in the prior art are methods that lead to reduction in the brittleness of coatings, which use a reactive resin that in itself is already of comparatively low brittleness, for example epoxy resins. WO2010060861A1 describes, for example, a homogeneous reaction resin which shows an improvement in the chemical properties of fracture toughness and impact resistance as a cured thermoset. In this case, for example, at least one organopolysiloxane is homogeneously distributed in an unhardened epoxy resin with the aid of a silicone organocopolymer which serves as dispersant. In a similar manner, Könczöl L. et al. (KONCZOl L. et al; ISSN: 2021-8995; DOI: 10.1002/APP.1994.070540612) teach the use of polysiloxane-polycaprolactone block copolymers for impact modification of epoxy resins.

However, the prior art teaches that this extrinsic impact modification works only when the reactive resin as such has a certain intrinsic toughness, as is the case for epoxy resins. This process is unsuitable for very brittle, vitreous reactive resins. (Li Zhongatao; doctoral thesis from 2000, entitled: "High fracture toughness and high modules silicone resins", published at http://hdl.handle.net/1721.1/8301).

OBJECT OF THE INVENTION

It was therefore an object of the present invention to provide inexpensive coating compositions for proppants, a process for coating proppants and the coated proppants. These proppants, after coating and curing, should have the necessary hardness and compressive strength and simultaneously show elastic properties, in order that there is no fracturing or flaking-off of the coating.

SUMMARY OF THE INVENTION

These and other objects are surprisingly achieved by the modified reactive resin compositions of the invention.

The reactive resin compositions of the invention comprise
(A) 92%-99.5% by weight of at least one reactive resin, and
(B) 0.5%-8% by weight of at least one silicone resin composed of units of the formulae (Ia), (Ib), (VII) and (Id)

$$[R^{17}SiO_{3/2}] \quad (Ia)$$

$$[SiO_{4/2}] \quad (Ib)$$

$$[R^{17}{}_3SiO_{1/2}] \quad (VII)$$

$$[R^{17}{}_2SiO_{2/2}] \quad (Id)$$

where
$R^{17}$ are identical or independently different monovalent substituted or unsubstituted organic radicals that bear or do not bear functional groups, an —OH or a hydrogen radical, with the conditions that
in (B) at least 20 mol % of the formula (Ia) or (Ib) or of a mixture of the two is present,
in (B) at most 50 mol % of the formula (Ib) is present, alkoxy groups are present in (B) as $R^{17}$ to an extent of at least 5% by weight.

Component (A)

Preferably, the reactive resin composition of the invention comprises just one reactive resin (A).

The reactive resins (A) must form a firm, non-tacky coating at ambient temperatures. This is necessary in order that the coated particles remain free-flowing, such that they do not agglomerate under normal storage conditions. The coating can essentially be cured such that little or no crosslinking takes place under conditions within the borehole. The coating may also be only partly cured or provided with other reactive groups, such that covalent crosslinking takes place under the conditions in the borehole.

Suitable reactive resins (A) in accordance with the invention are all polymeric or oligomeric organic compounds provided with a sufficient number of reactive groups suitable for a hardening reaction. All reactive resins known in the prior art that can be processed to thermosets are suitable, irrespective of the respective crosslinking mechanism that proceeds in the hardening of the respective reactive resin. In principle, they can be divided into three groups according to the nature of the crosslinking mechanism by addition, condensation or free-radical polymerization.

From the first group of the polyaddition-crosslinked reactive resins (A), preference is given to selecting one or more epoxy resins, urethane resins and/or air-drying alkyd resins as a starting material. Epoxy resins and urethane resins are generally crosslinked by addition of stoichiometric amounts of a hardener containing hydroxyl, amino, carboxyl or carboxylic anhydride groups, the hardening reaction being effected by addition of the oxirane or isocyanate groups in the resin onto the corresponding groups in the hardener. In the case of epoxy resin, catalytic hardening is also possible by polyaddition of the oxirane groups themselves. Air-drying alkyd resins crosslink through autoxidation with atmospheric oxygen. Addition-hardening silicone resins are also known, preferably those with the proviso that no further free silanes are present.

Examples of the second group of reactive resins (A) that are crosslinked by polycondensation are preferably condensation products of aldehydes, e.g. formaldehyde, with aliphatic or aromatic compounds containing amine groups, for example urea or melamine, or with aromatic compounds such as phenol, resorcinol, cresol etc., and also pure and resins, saturated polyester resins and condensation-hardening silicone resins. The hardening usually takes place here via increasing temperature with elimination of water, low molecular weight alcohols or other low molecular weight compounds.

From the third group of the polymerization-crosslinked reactive resins, preferred starting resins for the reactive resins modified in accordance with the invention are one or more homo- or copolymers of acrylic acid and/or methacrylic acid or esters thereof, and also unsaturated polyester resins, vinyl ester resins and/or maleimide resins. These resins have polymerizable double bonds, the polymerization or copolymerization of which brings about three-dimensional crosslinking. The starters used are compounds capable of forming free radicals, for example peroxides, peroxo compounds or compounds containing azo groups.

It is also possible to initiate the crosslinking reaction by means of high-energy radiation, such as UV or electron beams.

Not just the aforementioned reactive resins (A) but also all others suitable for production of thermosets can be modified in the manner proposed in accordance with the invention and, after crosslinking and hardening, result in thermosets having considerably improved fracture and impact resistance, with retention of other essential properties characteristic of thermosets, such as strength, heat distortion resistance and chemical resistance, in an essentially unchanged manner.

The preferred reactive resins (A) are the phenol-formaldehyde resins. These reactive resins (A) include heat-curing phenol resins of the resol type and phenol-novolak resins, which can be rendered thermally reactive by addition of catalyst and formaldehyde. The reactive resins (A) can either be fully cured during the coating of the proppant particles or only partly cured. Proppants having an only partly hardened coating do not cure until they have been introduced into deeper strata during fracking.

Particularly preferred reactive resins (A) are phenol-novolak resins. These are obtainable, for example, from Plastics Engineering Company, Sheboygan, USA, under the Resin 14772 name. If such a reactive resin is used, it is necessary to add a crosslinking agent (C) to the mixture in order to bring about the subsequent curing of the reactive resin. Hexamethylene-tetramine is the preferred material as (C) for this function, since it serves both as catalyst and as formaldehyde source.

(A) is used in amounts of 92% by weight, preferably at least 93% by weight and especially at least 94% by weight, and in amounts of at most 99.5% by weight, preferably at most 99% by weight and especially at most 98% by weight.

Component (B)

The reactive resin compositions of the invention comprise at least one silicone resin (B) in amounts of at least 0.5% and at most 8% by weight, preferably in amounts of 1% to at most 7% by weight, especially in amounts of at least 2% to 6% by weight.

The silicone resins (B) may be solid or liquid at room temperature.

The silicone resins (B) are preferably those that have a molecular weight Mw of at least 500, preferably at least 600, more preferably at least 700, and at most 5000, preferably at most 4000, more preferably at most 3000, where the polydispersity is at most 20, preferably at most 18, more preferably at most 16, and especially at most 15.

The silicone resins (B) contain at least 20 mol %, preferably at least 25 mol %, more preferably at least 30 mol %, especially at least 35 mol %, of repeat units of the formula (Ia) or (Ib) or of a mixture of the formulae (Ia) and (Ib), where repeat units of the formula (Ib) are present in an amount of at most 50 mol %, preferably at most 40 mol %, more preferably at most 20 mol %. In a particularly preferred embodiment, no units (Ib) are present in the silicone resins (B).

Repeat units of the formula (Id) may be present in the silicone resins (B) in an amount up to 80 mol %, preferably up to 70 mol %, more preferably up to 60 mol %, and especially up to 50 mol %. In a further embodiment, no units (Id) are present in the silicone resins (B) prepared in accordance with the invention.

The silicone resins (B) contain alkoxy groups as $R^{17}$ to an extent of at least 5% by weight, preferably at least 8.5% by weight, and especially at least 12% by weight. Examples of suitable alkoxy groups as $R^{17}$ are hydrocarbyloxy radicals having 1 to 16 carbon atoms, which may also be substituted. Particularly suitable and hence preferred are methoxy, ethoxy, isopropoxy and tert-butoxy radicals and the p-nitrophenoxy radical.

All other $R^{17}$ radicals may independently be monovalent hydrocarbyl radicals that are substituted or unsubstituted. They are preferably pure hydrocarbyl radicals, preferably having 1 to 16 carbon atoms. Selected examples of suitable hydrocarbyl radicals $R^{17}$ are alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical, cycloalkyl radicals, such as cyclopentyl, cyclohexyl, cycloheptyl and methylcyclohexyl radicals, aryl radicals such as the phenyl, naphthyl, anthryl and phenanthryl radical, alkaryl radicals such as tolyl radicals, xylyl radicals and ethylphenyl radicals, and aralkyl radicals such as the benzyl radical and the β-phenylethyl radical. Preferred hydrocarbyl radicals as $R^{17}$ radicals are methyl, n-propyl, isopropyl, phenyl, n-octyl, or isooctyl radicals, the methyl, the n-propyl, the phenyl and the isooctyl radicals being particularly preferred, and the methyl and the phenyl radicals being especially preferred.

In combination with the aforementioned alkoxy groups, in the silicone resin (B), in a preferred embodiment, at least 10 mol % of all $R^{17}$ radicals are independently identical or different monovalent substituted or unsubstituted organic radicals having at least 3 carbon atoms. At least 15 mol % is preferred, more preferably at least 20 mol %, especially at least 25 mol %. The aforementioned hydrocarbyl radicals preferably have 3 to 18 carbon atoms.

Examples of organic substituted radicals having at least 3 carbon atoms are also polyether radicals of the general formula (XIX)

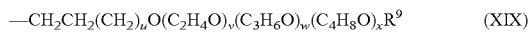

where
$R^9$ is a hydrocarbyl radical having 1 to 6 carbon atoms or H, preferably Me or H,
u is 0 or an integer from 1 to 16, preferably 1 to 4,
v is 0 or an integer from 1 to 35, preferably 1 to 25,
w is 0 or an integer from 1 to 35, preferably 1 to 25,
x is 0 or an integer from 1 to 35, preferably 1 to 25,
with the proviso that the sum total of v+w+x is 1 to 70, preferably 1 to 50.

In a further preferred embodiment of the silicone resins (B), the independent $R^{17}$ radicals bear another at least 1 mol %, preferably at least 2 mol %, more preferably at least 3 mol %, especially at least 4 mol %, very particularly at least 6 mol %, of independent functional groups or silicon-bonded hydrogen, solely in combination with the aforementioned alkoxy groups.

In an especially preferred embodiment of the silicone resins (B), the independent $R^{17}$ radicals bear another at least 1 mol %, preferably at least 2 mol %, more preferably at least 3 mol %, especially at least 4 mol %, very particularly at least 6 mol %, of independent functional groups or silicon-bonded hydrogen, in combination with the aforementioned alkoxy groups or simultaneously with the monovalent substituted or unsubstituted organic radicals having at least 3 carbon atoms.

Examples of such $R^{17}$ radicals having functional groups are glycol radicals and hydrocarbyl radicals having functional organic groups selected from the group of the phosphoric esters, phosphoric esters, epoxy functions, amino functions, methacrylate functions, carboxyl functions, acrylate functions, olefinically or acetylenically unsaturated hydrocarbons.

The respective functional groups may optionally be substituted.

The $R^{17}$ radicals may optionally be hydroxy-, alkyloxy- or trimethylsilyl-terminated. In the main chain, nonadjacent carbon atoms may be replaced by oxygen atoms.

The functional groups in $R^{17}$ are generally not bonded directly to the silicon atom. Exceptions from this are olefinic or acetylene groups, which may also be present in directly silicon-bonded form, in particular the vinyl group. The other functional groups in $R^{17}$ are bonded via spacer groups to the silicon atom, where the spacer is always in Si—C-bonded form. The spacer is a divalent hydrocarbyl radical which comprises 1 to 30 carbon atoms and in which nonadjacent carbon atoms may be replaced by oxygen atoms and which may also contain other heteroatoms or heteroatom groups, although this is not preferred.

The preferred functional groups methacrylate, acrylate and epoxy are preferably bonded via a spacer to the silicon atom, where the spacer consists of 3 to 15 carbon atoms, preferably 3 to 8 carbon atoms, especially 3 carbon atoms, and optionally additionally at most one to 3 oxygen atoms, preferably at most 1 oxygen atom.

The likewise preferred carboxyl group is preferably bonded to the silicon atom via a spacer, where the spacer consists of 3 to 30 carbon atoms, preferably 3 to 20 carbon atoms, especially 3 to 15 carbon atoms, and optionally additionally also of heteroatoms, but preferably at most one to 3 oxygen atoms, preferably at most 1 oxygen atom, preferably no oxygen atom. $R^{17}$ radicals that bear carboxyl radicals as functional group are described by the general formula (VIII)

where $Y^1$ is preferably a divalent linear or branched hydrocarbyl radical having up to 30 carbon atoms, where $Y^1$ may also contain olefinically unsaturated groups or heteroatoms and the atom bonded directly to the silicon from the $Y^1$ radical is a carbon. Fragments containing heteroatoms that may typically be present in the $Y^1$ radical are —N($R^5$)—C(=O)—, —C—O—C—, —N($R^5$)—, —C(=O)—, —O—C(=O)—, —C—S—C—, —O—C(=O)—O—, —N($R^5$)—C(=O)—N($R^5$)—, where unsymmetrical radicals may be incorporated into the $Y^1$ radical in either possible direction, where $R^5$ is a hydrocarbyl radical or hydrogen.

If the radical of formula (VIII) is produced, for example, by ring opening and condensation of a maleic anhydride onto a silanol function, it would be a radical of the (cis)-C=C—COOH form.

$R^{17}$ radicals that bear functional groups and containing heteroatoms are, for example, carboxylic ester radicals of the general formula (IXa)

where $Y^1$ has the definition given above or, in a further embodiment, is not present at all in the formula (IXa). The $Y^2$ radical is quite generally an organic radical. $Y^2$ may also contain further heteroatoms and organic functions, such as double bonds or oxygen atoms, although this is not preferred. Preferred as $Y^2$ are hydrocarbyl radicals, for example alkyl radicals such as the methyl, ethyl, n-propyl, isopropyl, n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical, cycloalkyl radicals such as cyclopentyl, cyclohexyl, cycloheptyl and methylcyclohexyl radicals, aryl radicals such as the phenyl, naphthyl, anthryl and phenanthryl radicals, alkaryl radicals such as tolyl radicals, xylyl radicals and ethylphenyl radicals, and aralkyl radicals such as the benzyl radical and the β-phenylethyl radical. Particularly preferred hydrocarbyl radicals $Y^2$ are the methyl, the n-propyl, the isopropyl, the phenyl, the n-octyl and the isooctyl radicals.

$R^{17}$ may also bear, as functional group, an inversely bonded carboxylic ester radical, i.e. be a radical of the form (IXb)

$$Y^1\text{—}OC(=O)Y^2 \qquad (IXb)$$

where $Y^1$ and $Y^2$ have the same definition as in formula (IXa).

$R^{17}$ radicals that bear functional groups may also be carboxylic anhydride radicals of the general formula (X) or (XI)

$$Y^1\text{—}C\text{—}C(=O)\text{—}O\text{—}C(=O) \qquad (X)$$

$$Y^1\text{—}R^{14}C\text{—}C(=O)\text{—}O\text{—}C(=O)R^{15} \qquad (XI)$$

where $Y^1$ has the definition given above and $R^{14}$ and $R^{15}$ are each independently a C1-C8 hydrocarbyl radical that may optionally contain heteroatoms, although this is not preferred.

Further examples of $R^{17}$ radicals that bear functional groups are phosphonic acid radicals and phosphonic ester radicals of the general formula (XII)

$$Y^1\text{—}P(=O)(OR^{16})_2 \qquad (XII)$$

where $Y^1$ has the definition given above, the $R^{16}$ radicals are preferably independently hydrogen or hydrocarbyl radicals, having up to 18 carbon atoms. Preferred phosphonic acid radicals are those in which $R^{16}$ is hydrogen, methyl or ethyl, although this enumeration should be regarded as nonlimiting.

Examples of $R^{17}$ radicals bearing further functional groups are acryloxy or methacryloxy radicals of the methacrylic esters or acrylic esters, such as methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, t-butyl acrylate, t-butyl methacrylate, 2-ethylhexyl acrylate and norbornyl acrylate. Particular preference is given to methyl acrylate, methyl methacrylate, n-butyl acrylate, isobutyl acrylate, t-butyl acrylate, 2-ethylhexyl acrylate, and norbornyl acrylate. Further examples of $R^{17}$ radicals bearing functional groups are the preferred olefinically unsaturated hydrocarbyl radicals $R^{17}$ of the formulae (XIII) and (XIV)

$$Y^1\text{—}CR^7\text{=}CR^8R^9 \qquad (XIII)$$

$$Y^1\text{—}C\text{≡}CR^{10} \qquad (XIV)$$

where $Y^1$ has the definition given above or, in a further embodiment, is not present at all in the formulae (XIII) and (XIV), and the $R^7$, $R^8$, $R^9$ and $R^{10}$ radicals are independently a hydrogen atom or a C1-C8 hydrocarbyl radical which may optionally contain heteroatoms, where the hydrogen atom is the most preferred radical. Particularly preferred radicals (XIII) are the vinyl radical, the propenyl radical and the butenyl radical, especially the vinyl radical. The radical (XIII) may also be a dienyl radical bonded via a spacer, such as the 1,3-butadienyl or the isoprenyl radical bonded via a spacer.

Further examples of radicals $R^{17}$ bearing functional groups are those having epoxy groups of the formulae (XV) and (XVI)

$$(XV)$$

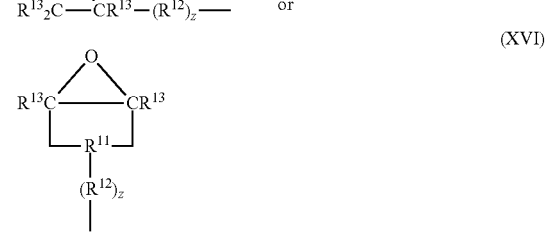
$$(XVI)$$

where
$R^{12}$ is a divalent hydrocarbyl radical which has 1 to 10 carbon atoms per radical and may be interrupted by an ether oxygen atom,
$R^{13}$ is a hydrogen atom or a monovalent hydrocarbyl radical which has 1 to 10 carbon atoms per radical and may be interrupted by an ether oxygen atom,
$R^{11}$ is a trivalent hydrocarbyl radical having 3 to 12 carbon atoms per radical and
z is 0 or 1.

Suitable examples of such epoxy-functional $R^{17}$ radicals are
3-glycidoxypropyl,
3,4-epoxycyclohexylethyl,
2-(3,4-epoxy-4-methylcyclohexyl)-2-methylethyl,
3,4-epoxybutyl,
5,6-epoxyhexyl,
7,8-epoxydecyl,
11,12-epoxydodecyl and
13,14-epoxytetradecyl radical.

Preferred epoxy radicals $R^{17}$ are the 3-glycidoxypropyl radical and the 3,4-epoxycyclohexylethyl radical.

Further examples of $R^{17}$ radicals bearing functional groups are those with amino groups of the general formula (XVIII)

$$\text{—}R^{20}\text{—}[NR^{21}\text{—}R^{22}\text{—}]_n NR^{21}{}_2 \qquad (XVIII)$$

where $R^{20}$ is a divalent linear or branched hydrocarbyl radical having 3 to 18 carbon atoms, preferably alkylene radical having 3 to 10 carbon atoms,
$R^{21}$ is a hydrogen atom, an alkyl radical having 1 to 8 carbon atoms or an acyl radical, such as acetyl radical, preferably a hydrogen atom,
$R^{22}$ is a divalent hydrocarbyl radical having 1 to 6 carbon atoms, preferably an alkylene radical having 1 to 6 carbon atoms,
n is 0, 1, 2, 3 or 4, preferably 0 or 1.

Particularly preferred $R^{17}$ radicals bearing functional groups are carboxylic acid-functional, amino-functional and epoxy-functional radicals. Especially preferred are amino-functional and epoxy-functional radicals.

In principle, the silicone resins (B) may bear various functional groups. However, this is only possible when the groups chosen do not react with one another under the conditions of regular storage, i.e. keeping at 23° C., 1013 mbar in containers with an air- and moisture-tight seal for 6 months. For example, combinations of vinyl groups and Si—H— groups are possible, since these require distinctly different conditions for the reaction with one another than those for regular storage, for example a catalyst and elevated temperature. A suitable selection of combinations of functional groups can be derived by the person skilled in the art in a simple manner from the published literature relating to chemical reactivity of (organo)functional groups.

If multiple $R^{17}$ radicals having functional groups are present in a unit of the formula (VII), these may independently be different radicals within the specified group of possible radicals, where the aforementioned conditions for the functional groups must be noted.

The Present Invention Further Provides the Process for Producing the Reactive Resin Composition.

In one embodiment, this is effected by dispersing (B) in (A) which is free-flowing at 20° C. or in (A) which has been rendered free-flowing by prior heating up to 250° C. or in (A) which has been dissolved in a suitable solvent in order to render it free-flowing. The person skilled in the art will know how (A) can be converted to free-flowing form without initiating the curing. If a solvent has been used, it can be evaporated thereafter. Suitable solvents are known to those skilled in the art and are selected depending on the reactive resin (A). In the case of phenolic resin, suitable solvents are, for example, ethyl acetate and acetone. Which solvents are suitable for which reactive resins is described, for example, in the following textbook: Polymer Handbook, Volume 2, 4th ed.; J. Brandrup, E. H. Immergut, E. A. Grulke; John Wiley & Sons, Inc., 1999 (ISBN 0-471-48172-6).

Suitable mixers are, for example, laboratory mixers, planetary mixers, or dissolvers, or rotor-stator systems, or else extruders, rolls, 3-roll mills, etc.

"Free-flowing" in connection with (A) and the reactive resin composition means that these are in a physical state of matter that enables distribution on the surface of the proppant (rendered free-flowing by prior heating to up to 250° C. or dissolved in a suitable solvent).

In the dispersing operation, (B) can dissolve entirely or partly in (A). Undissolved fractions are present in dispersed form as a second phase in (A). The average size of these domains is preferably less than 50 μm, preferably less than 20 μm, more preferably less than 10 μm.

The present invention further provides for the use of the reactive resin composition of the invention for coatings and for production of moldings, workpieces and foams. More particularly, the reactive resin composition of the invention is used for coating of proppants.

The present invention further provides the process for producing proppants coated in accordance with the invention.

The person skilled in the art will be aware of various ways of coating proppants with resins from the prior art. These processes can also be used for the coating of proppants with the present reactive resin compositions of the invention.

In order to make maximum use of the advantageous effect of the coating, it is important to ensure a particularly good dispersing of (A) with (B). In the embodiment preferred for this purpose, the reactive resin composition of the invention, in free-flowing form—i.e. already free-flowing at 20° C. or melted by heating to 250° C. and therefore free-flowing or dissolved in a suitable solvent and therefore free-flowing—is applied to the proppant, for example by spraying or mixing, together with or without at least one hardener (C) and with or without at least one additive (D), and then cured. Suitable solvents have already been described above.

In a particularly preferred embodiment, the reactive resin composition of the invention is melted by heating to 250° C. and therefore applied in free-flowing form to the proppant, for example by spraying or mixing, together with or without at least one hardener (C) and with or without at least one additive (D), and then cured.

The previous statements are applicable to the solvents.

If, by contrast, economic advantages are more important or maximum flexibility in the production process for the coated proppants is advantageous, the alternative production method which follows is used. The first component step can also be referred to as an in situ process for the production of the reactive resin composition of the invention since it is effected in the presence of the proppant. In this production process, (B) is mixed together with (A) which is free-flowing at 20° C. or with (A) that has been rendered free-flowing by prior heating to up to 250° C., or with (A) which has been dissolved in a suitable solvent, and the proppant, optionally with addition of hardener (C) and optionally further additives (D), and cured. The sequence of addition of components (A), (B), (C) and (D) is variable here, with the proviso that component (B) is mixed in before substantial curing of the reactive resin occurs. This has the advantage that rapid adjustment of the ratios of (A) to (B) can be effected in a simple and uncomplicated manner at any time.

This process for producing coated proppants is thus characterized in that i) in situ production of the reactive resin composition is effected by mixing at least one (B) with at least one (A) which is free-flowing at 20° C., or with (A) that has been rendered free-flowing by prior heating to up to 250° C., or with (A) which has been dissolved in a suitable solvent, and at least one proppant, and with or without at least one hardener (C) and with or without at least one additive (D), ii) and only thereafter is curing effected.

In a further alternative production process for proppants coated in accordance with the invention, (A) is mixed with a suitable solvent, proppant and (B). It is optionally possible to add hardener (C) and possibly further additives (D) to the mixture. Subsequently, the solvent is evaporated off and the proppants thus coated are hardened. The sequence of addition of components (A), (B), (C) and (D) is variable.

In a particularly preferred possible embodiment, a suitable proppant, for example sand, is preheated to about 170-260° C. In a mixer, the reactive resin composition of the invention, a suitable hardener (C) and optionally various additives (D) are then added.

In another alternative, a suitable proppant, for example sand, is preheated to about 170-260° C. In a mixer, (A), (B), a suitable hardener (C) and optionally various additives (D) are then added.

The production of layers should be understood as follows: multiple layers are produced in multiple successive coating and hardening cycles. In other words, after the wetting of the surface of the problems with the reactive resin composition of the invention, this layer is at first partly or fully hardened. Subsequently, a new layer of the reactive resin composition of the invention is applied and again partly or fully hardened.

This contrasts with the application of the reactive resin composition of the invention in portions in multiple steps without any substantial intermediate hardening of the individual portions, and only at the end is there partial or complete hardening. Thus, this leads only to a single layer.

Proppants

Suitable proppants have long been known to the person skilled in the art from the prior art and can be used for the coating of the invention. Proppants are typically hard particles of high-strength, for example sand or gravel composed of rocks such as limestone, marble, dolomite, granite etc., but also glass beads, ceramic particles, ceramic spheres and the like, this list being illustrative and nonlimiting. Preferably, the proppant particles exhibit an essentially spherical, i.e. ball-shaped form, since this leaves sufficient interspace in order that the crude oil or gas can flow past. Therefore, coarse-grain sand, glass beads and hollow glass spheres (called microballoons) are preferred as proppants. Particular preference is given to using sand as proppant. Preferably, the proppant particles have an average size of 5000 to 50 µm, more preferably an average size of 1500 to 100 µm. In addition, they preferably have a side ratio of length to width of not more than 2:1.

Hardeners (C)

Suitable hardeners have long been known to the person skilled in the art from the prior art and are selected in accordance with the reactive resin used. A preferred hardener (C) for novolaks is urotropin. (C) and hence urotropin is typically used in amounts between 8% and 20% by weight, based on the amount of reactive resin composition of the invention. Preferably, urotropin is applied to the melt of the reactive resin as an aqueous solution. Methods of this kind are likewise known to the person skilled in the art and are described, for example, in U.S. Pat. No. 4,732,920.

Additive (D)

Suitable additives (D) have likewise long been known to the person skilled in the art from the prior art. Non-exclusive examples are antistats, separating agents, adhesion promoters, etc.

Suitable proppants, hardeners (C) and additives (D) are described, for example, in U.S. Pat. No. 4,732,920 and US2007/0036977 A1.

For optimal performance of the proppant coated in accordance with the invention, the type specification of the proppant, type and specification of the reactive resin (A), organopolysiloxane (B), hardener (C) and any additives (D), the type of mixing and coating process, the sequence of addition of the components and the mixing times have to be matched to one another according to the requirement of the specific application. Any change in the proppant, under some circumstances, requires adjustment of the coating process and/or the hardeners (C) and additives (D) used.

The present invention thus also further provides the coated proppants that have been coated in accordance with the invention and are obtainable by the process described above.

In the proppants of the invention, the surface of the proppant may have been wholly or partly coated. Preferably, on examination by scanning electron microscope, at least 20% of the visible surface of the proppant has been coated with the reactive resin composition of the invention, more preferably at least 50%.

Preferably, on examination by scanning electron microscope, at least 5% of the proppant particles are fully coated on their visible side, more preferably at least 10%.

The major portion of the coating on the proppant of the invention is 0.1 to 100 µm thick, preferably 0.1 to 30 µm, more preferably 1 to 20 µm.

Preferably, the proppants of the invention have been coated with fewer than three layers of the reactive resin composition of the invention, more preferably with just one layer.

The reactive resin composition of the invention is preferably used in amounts of 0.1-20% by weight, based on the weight of the proppant, preferably of 0.5-10% by weight and especially preferably of 1-5% by weight.

The present invention further provides for the use of the proppants coated in accordance with the invention in fracking production methods for mineral oil and natural gas.

Advantages of the Invention

The reactive resin composition of the invention has improved leveling properties in coating processes. As a result, surfaces are coated more uniformly. It is possible to obtain smoother and shinier surfaces.

The reactive resin compositions of the invention show advantages in the coating of proppants in that the level of reject material resulting from sticking of the proppant is noticeably reduced.

The reactive resin composition of the invention, as a hardened coating for proppants, has improved fracture resistance, toughness and elasticity and formability at the same hardness. The coating has a reduced tendency to fracture and flake off and protects the proppant more effectively and for a longer period of time against high pressures and impacts. Thus, the stability of the overall proppant is improved.

Conventional proppants according to prior art are very brittle and have a high tendency to fracture. Fracture of the proppant results in release of fines. Release of fines has an adverse effect on the rate at which the crude oil or natural gas flows through in that the interstices between the proppant grains are blocked and hence the oil or gas source quickly becomes unviable. New wells or refracking become necessary.

By contrast, the proppants coated in accordance with the invention are more resistant to stresses such as impacts, the formation of pressure and thus have a lower tendency to fracture.

A further advantage of the coating of the invention lies in its formability, such that it frequently does not itself fracture on fracturing of the brittle proppant grains and thus encases or retains the resultant fines like a plastic shell and hence overall reduces the release thereof.

These advantageous properties of the proppants coated in accordance with the invention allow oil or gas flow to be maintained for longer. This gives rise to crucial economic and environmental advantages.

EXAMPLES

The examples which follow elucidate the invention without having any limiting effect. In the examples described hereinafter, all figures given for parts and percentages, unless stated otherwise, are based on weight. Unless stated otherwise, the examples which follow are conducted at a pressure of the surrounding atmosphere, i.e. at about 1000 hPa, and at room temperature, i.e. at 25° C., or at a temperature which is established on combination of the reactants at room temperature without additional heating or cooling. All viscosity figures hereinafter relate to a temperature of 25° C.

Abbreviations Used:

The meaning of the abbreviations used further up also applies to the examples:

PTFE=polytetrafluoroethylene
rpm=revolutions per minute
Molecular Weight Distributions:

Molecular weight distributions are determined as the weight average Mw and as the number average Mn, employing the method of gel permeation chromatography (GPC or size exclusion chromatography (SEC)) with polystyrene standard and refractive index detector (RI detector). Unless stipulated otherwise, THF is used as eluent and DIN 55672-1 is employed. The polydispersity is the quotient Mw/Mn.

Example 1

A glass flask was purged with nitrogen, charged with 475 g of novolak "Resin 14772" (Plastics Engineering Company, Sheboygan, USA) and purged with nitrogen once again. The material was melted at 120° C. Then a stirrer was switched on at 420 rpm. 25 g of silicone resin 1 of the composition $[PhSiO_{3/2}]_{7.3.5}$ $[(3\text{-glycidoxypropyl})SiO_{3/2}]_{4.20}$ $[Me_2SiO_{2/2}]_{3.45}$ $[MeO_{1/2}]_{6.68}$ $[BuO_{1/2}]_{0.64}$ (molecular weight according to SEC (THF eluent): Mw=2100 g/mol; Mn=1300 g/mol; viscosity 90-135 cSt; epoxy equivalent weight 660-680 g/mol; epoxy value 1.85 mmol/g) were added and the mixture was stirred at 420 rpm, 10 minutes. The liquid material is poured hot onto a PTFE film and mechanically comminuted, and hence a granular material is produced.

Example 2

By the process of example 1, 25 g of silicone resin 2 of the composition $[PhSiO_{3/2}]_{7.30}$ $[(2\text{-amino-ethyl})\text{-3-amino-propyl-}SiO_{3/2}]_{2.62}$ $[Me_2SiO_{2/2}]_{3.86}$ $[MeO_{1/2}]_{5.88}$ $[BuO_{1/2}]_{0.57}$ (molecular weight according to SEC (THF/acetic anhydride eluent): Mw=1800 g/mol; Mn=1200 g/mol; viscosity (kinematic, 25° C.) 120 mm²/s; amine value 2.6-2.9 mmol/g) rather than silicone resin 1 were incorporated and a granular material was produced.

Example 3

By the process of example 1, 25 g of silicone resin 3 of the composition $[PhSiO_{3/2}]_{9.44}$ $[MeSiO_{3/2}]_{5.67}$ $[Me_2SiO_{2/2}]_{0.63}$ $[MeO_{1/2}]_{6.77}$ (molecular weight according to SEC (THF eluent): Mw=1800 g/mol; Mn=900 g/mol; viscosity (kinematic, 25° C.) 280 mm²/s) rather than silicone resin 1 were incorporated and a granular material was produced.

Example 4

By the process of example 1, 25 g of silicone resin 4 of the composition $[MeSiO_{3/2}]_{23.14}$ $[EtO_{1/2}]_{27.28}$ (molecular weight according to SEC (toluene eluent): Mw=2560 g/mol; Mn=900 g/mol; viscosity (dynamic, 25° C.) 25 mPa·s) rather than silicone resin 1 were incorporated and a granular material was produced.

Comparative Example 1 (V1)

By the process of example 1, 25 g of silicone resin 5 of the composition $[Me_3SiO_{1/2}]_{26.65}$ $[ViMe_2SiO_{1/2}]_{3.72}$ $[SiO_{4/2}]_{42.78}$ $[HO_{1/2}]_{1.02}$ $[EtO_{1/2}]_{5.93}$ (molecular weight according to SEC (toluene eluent): Mw=5300 g/mol; Mn=2560 g/mol) rather than silicone resin 1 were incorporated and a granular material was produced.

Comparative Example 2 (V2)

A glass flask was purged with nitrogen, charged with 475 g of novolak "Resin 14772" (Plastics Engineering Company, Sheboygan, USA) and purged once again with nitrogen. The material was melted at 120° C. Then a stirrer was switched on at 420 rpm. 25 g of silicone resin 3 of the composition $[PhSiO_{3/2}]_{9.44}$ $[MeSiO_{3/2}]_{5.67}$ $[Me_2SiO_{2/2}]_{0.63}$ $[MeO_{1/2}]_{6.77}$ (molecular weight according to SEC (THF eluent): Mw=1800 g/mol; Mn=900 g/mol; viscosity (kinematic, 25° C.) 280 mm²/s) and 5 g of oxalic acid were added and the mixture was stirred at 420 rpm initially at 130° C. under reflux for 1 h. Then the mixture was heated to 180° C. within 2 h and condensate that occurred was removed. This was followed by distillation at 180° C. for a further 30 min. The fluid mass was poured hot onto a PTFE film and mechanically comminuted and hence a granular material was produced.

No catalyst was added in the mixing of the silicone resin (B) and the reactive resin (A) in inventive examples 1-4 and in noninventive comparative example V1. A physical mixture is formed. In noninventive comparative example V2, a catalyst was added and reacted at elevated temperature for a prolonged period. A hybrid material is the result of chemical reaction of novolak and silicone resin. In comparative example V2, a silicone resin containing D groups of the formula $[Me_2SiO_{2/2}]$ was used, as disclosed in US20140124200A.

It was found that, unexpectedly, the silicone resins (B) of the invention are distributed uniformly and finely in the reactive resin. If a second phase is formed, it is essentially in the form of spherical droplets. By contrast the solid noninventive polysiloxane from comparative example V1 is not finely dispersible and forms uneven lumps and fragments in the phenolic resin, some of which are up to 100 μm in size.

Comparative Example 3 (V3)

Comparative example V3 was unmodified novolak "Resin 14772" (Plastics Engineering Company, Sheboygan, USA).

Example 6

Preparation of Reactive Resin Solutions for Production of Test Specimens and Coating of Q-PANEL Test Sheets:

10 parts in each case of the inventive modified phenol resins from example 3 or 10 parts of the noninventive modified phenol resin from comparative example V2 or 10 parts of the pure modified phenol Resin 14772 (Plastics Engineering Company, Sheboygan, USA) were dissolved in each case together with 1 part urotropin and 10.0 parts ethyl acetate (from Bernd Kraft, >=99%) by agitation overnight.

Example 7

Production of Phenolic Resin-Coated Q-PANEL Test Sheets:

For the brittleness determination experiments, Q-PANEL test sheets were cleaned 3× with acetone on the brushed side and then flashed off in a fume hood for 1 h. Subsequently, 3 mL of the appropriate phenolic resin solution from example 6 were applied to each sheet and spread with a 100 μm coating bar, and then the solution was evaporated off in a fume hood overnight.

For hardening, the samples were placed into a cold drying cabinet, heated up to 160° C. while purging with nitrogen within 3 hours, kept at this temperature for 2 h and cooled down to 23° C. overnight.

The evaporation of the solvent gives rise to an about 50 μm-thick hardened resin layer on the sheet.

Example 8

Testing of Durability:

By means of a ball impact tester, it is possible to examine the stability of the coating in isolated form. A conclusion is obtained with regard to the elasticity, impact resistance and fracture resistance of a coating.

For detection of the improved properties, i.e. toughness and impact resistance to impacts and pressure, according to Examples 6 and 7, a hardened layer of the inventive resins from example 3 of thickness about 50 μm in each case was produced on a Q-PANEL test sheet, or, as comparative examples, a hardened layer of the unmodified Resin 14772 (Plastics Engineering Company, Sheboygan, USA) of thickness about 50 μm and of the noninventive resin from comparative example V2. The coated sheets were tested in an Erichsen ball impact tester, model 304-ASTM, and the results were visually evaluated by a trained tester: for this purpose, a ball was allowed to fall from a defined, variable drop height onto the reverse side of the sheet (twin experiments in each case at different sites). The impact energy is found from the drop height multiplied by drop weight, reported in inches (in)×pounds (lbs). The impact energy is altered as follows: 5, 10, 15, 20, 25, 30, 35, 40 (in×lbs). The bulging impact sites were assessed visually for fissures and cracks and assessed relative to the reference.

Table 1 shows the assessment of the resin coating on Q-PANEL test sheets and the stability thereof by means of a ball impact tester.

TABLE 1

| Resin from example | Siloxane additive | Impact test | Description |
|---|---|---|---|
| 3 | Silicone resin 3 | ++ | cracking from 35 inch × lbs; flaking from 40 in × lbs |
| V2 | Silicone resin 3 | + | cracking from 10 inch × lbs; flaking from 25 in × lbs |
| V3 | No additive | 0 | cracking from 5 inch × lbs |

The values should be understood as follows:

"0" means a cracking profile similar to the reference. The reference shows distinct cracking even at the lowest energy, from 5 inch×lbs. The extent of cracking is similar to the reference.

"+" means a better cracking profile than the reference, meaning that distinct cracks are only apparent at a higher energy in the range of 10-30 inch×lbs, or the extent of cracking is distinctly reduced overall compared to the reference. "++" means that no cracks are apparent up to an energy of 30 inch×lbs.

Completely surprisingly, the cured coating of the invention in Example 3 has significantly improved elasticity, impact resistance and fracture resistance compared to the unmodified comparative example V3 and to the laboriously producible hybrid material from noninventive comparative example V2, which contains the same silicone resin.

Example 9

Production of Coated Proppants:

20-40 mesh fracking sand were coated with 3.5% of the inventive resins from examples 1 and 2, or, as comparative examples, with 3.5% of the unmodified Resin 14772 (Plastics Engineering Company, Sheboygan, USA) and of the noninventive resin from comparative example V1 by a melting method and cured with 10% by weight of urotropin, based on the amount of resin.

Example 10

Study of Pressure Stability of Coated Proppants:

The pressure stability of the coated proppants according to example 8 was studied according to DIN EN ISO 13503-2 at pressure 14000 PSI and 18000 PSI. The result is shown in table 2.

TABLE 2

| Fracking sand coated with resin from example | Amount of fines formed relative to the proppants having unmodified coating with resin from Comparative Example V3 (%) | |
|---|---|---|
| | at 14,000 PSI | at 18,000 PSI |
| 1 | 82 | 87 |
| 2 | 82 | 81 |
| V1 | 98 | 104 |
| V3 | 100 | 100 |

It is found that, completely surprisingly, about 15-20% less fines is formed in the case of the proppants coated in accordance with the invention compared to the proppants with unmodified coating and to non-inventively coated resin from Comparative Example V1. The improvement in the compressive strength of the proppants coated in accordance with the invention was entirely unexpected, since an improvement in the fracture and impact resistance of the reactive resins modified in accordance with the invention did not permit any fundamental conclusion that this will automatically also lead to an improvement in compressive strength.

The invention claimed is:

1. A reactive resin composition, comprising:
   a physical admixture of
   (A) 92%-99.5% by weight of at least one reactive phenol/formaldehyde resin, and
   (B) 0.5%-8% by weight of at least one silicone resin comprising units of the formulae (Ia), (Ib), (VII) and (Id)

$$[R^{17}SiO_{3/2}] \quad (Ia)$$

$$[SiO_{4/2}] \quad (Ib)$$

$$[R^{17}_3SiO_{1/2}] \quad (VII)$$

$$[R^{17}_2SiO_{2/2}] \quad (Id)$$

where
$R^{17}$ each is an identical or different monovalent, optionally substituted organic radical optionally bearing functional groups, —OH, or a hydrogen radical,
with the provisos that
   in (B) at least 20 mol % of the formula (Ia) or (Ib) or a mixture thereof is present,
   in (B) at most 50 mol % of the formula (Ib) is present,
   alkoxy groups are present in (B) as $R^{17}$ to an extent of at least 5% by weight, prepared by the process of dissolving and/or dispersing (B) into (A), and isolating a product comprising reactive resin (A) which has not reacted with (B).

2. The reactive resin composition of claim 1, wherein (B) comprises at least 8.5% by weight of alkoxy groups.

3. The reactive resin composition of claim 1, wherein at least 10 mol % of all $R^{17}$ radicals are independently identical or different monovalent optionally substituted organic radicals having at least 3 carbon atoms.

4. The reactive resin composition of claim 3, wherein as further $R^{17}$ radicals, at least 1 mol % are independently selected from organofunctional radicals and silicon-bonded hydrogen.

5. The reactive resin composition of claim 1, wherein at least 1 mol % of all $R^{17}$ radicals are independently organofunctional radicals or silicon-bonded hydrogen.

6. A process for preparing the reactive resin composition of claim 1, comprising: dispersing (B) in (A) with the proviso that (A) is free-flowing at 20° C., (A) has been rendered free-flowing by prior heating up to 250° C. or (A) has been dissolved in a suitable solvent to render it free-flowing.

7. A solid coating, molding, workpiece, or foam, comprising a cured reactive resin composition of claim 1.

8. A proppant having a cured coating of a reactive resin composition of claim 1.

9. A process for producing coated proppants, comprising: providing a coating composition comprising a reactive resin composition of claim 1 in free-flowing form, optionally adding one or more hardener(s) (C) to the reactive resin composition, and optionally adding one or more additive(s) (D) to the reactive resin composition, coating proppant particles with the coating composition, and then curing the reactive resin composition.

10. A coated proppant prepared by the process of claim 9.

11. A process for producing coated proppants, comprising:
  i) producing a reactive resin composition of claim 1 as an in situ process in the presence of the proppant, by mixing at least one (B) and
  at least one (A) which is free-flowing at 20° C., or with (A) that has been rendered free-flowing by prior heating to up to 250° C., or with (A) which has been dissolved in a suitable solvent, and
  proppant particles,
  optionally adding one or more hardener(s) (C)
  optionally adding one or more additive(s) (D),
  ii) and thereafter curing the reactive resin composition to form coated proppant particles.

12. A coated proppant prepared by the process of claim 11.

13. In a fracking production method for mineral oil and natural gas production wherein a proppant is employed, the improvement comprising employing a proppant coated with a cured reactive resin composition of claim 1.

14. A reactive resin composition suitable for use in coating proppant particles, consisting of:
  1) a physical admixture of
    A) a phenol/formaldehyde reactive resin in an amount of from 92 to 99.5 weight percent, and
    B) from 0.5 to 8 weight percent of a silicone resin containing units of the formulae (Ia), (Ib), (VII), and (Id)

$$[R^{17}SiO_{3/2}] \quad (Ia)$$

$$[SiO_{4/2}] \quad (Ib)$$

$$[R^{17}_{3}SiO_{1/2}] \quad (VII)$$

$$[R^{17}_{2}SiO_{2/2}] \quad (Id)$$

where
$R^{17}$ each is an identical or different monovalent, optionally substituted organic radical optionally bearing functional groups, —OH, or a hydrogen radical,
with the provisos that
  in (B) at least 20 mol % of the formula (Ia) or (Ib) or a mixture thereof is present,
  in (B) at most 50 mol % of the formula (Ib) is present,
  alkoxy groups are present in (B) as $R^{17}$ to an extent of at least 5% by weight, and
wherein the silicone resin (B) is dispersed in, dissolved in, or both dissolved and dispersed in unmodified reactive resin (A);
  2) optionally, one or more hardeners for the unmodified reactive resin (A); and
  3) optionally, one or more additives selected from the group consisting of antistats, separating agent, and adhesion promoters.

15. The reactive resin composition of claim 14, wherein urotropin is present as a hardener.

16. A process for producing coated proppant particles, comprising coating proppant particles with an uncured coating composition of claim 14, and curing the coating composition to produce coated proppant particles.

* * * * *